US011321842B1

(12) United States Patent
Tiwari et al.

(10) Patent No.: US 11,321,842 B1
(45) Date of Patent: May 3, 2022

(54) SPATIAL-AND-CONTEXT AWARE VIRTUAL BIOPSY RADIOGENOMIC MAPS TO TARGET TUMOR MUTATIONAL STATUS

(71) Applicant: Case Western Reserve University, Cleveland, OH (US)

(72) Inventors: Pallavi Tiwari, Wexford, PA (US); Anant Madabhushi, Shaker Heights, OH (US); Marwa Ismail, Louisville, KY (US); Niha Beig, New Brunswick, NJ (US); Prateek Prasanna, Norfolk, VA (US)

(73) Assignee: Case Western Reserve University, Cleveland, OH (US)

( * ) Notice: Subject to any disclaimer, the term of this patent is extended or adjusted under 35 U.S.C. 154(b) by 0 days.

(21) Appl. No.: 16/952,615

(22) Filed: Nov. 19, 2020

(51) Int. Cl.
*G06K 9/00* (2006.01)
*G06T 7/00* (2017.01)

(52) U.S. Cl.
CPC .. *G06T 7/0014* (2013.01); *G06T 2207/20081* (2013.01); *G06T 2207/30096* (2013.01)

(58) Field of Classification Search
CPC ......... G06T 7/0014; G06T 2207/20081; G06T 2207/20084; G06T 2207/30096
See application file for complete search history.

(56) References Cited

U.S. PATENT DOCUMENTS

2015/0356730 A1\* 12/2015 Grove .................. G06T 7/64
382/124

\* cited by examiner

*Primary Examiner* — Atiba O Fitzpatrick
(74) *Attorney, Agent, or Firm* — Eschweiler & Potashnik, LLC

(57) ABSTRACT

Embodiments discussed herein facilitate determination of tumor mutation status based on context and spatial information. One example embodiment can access a MRI scan of a tumor comprising voxels; extract radiomic feature(s) from the voxels; generate a spatial feature descriptor indicating probabilities the tumor has a first mutation status and a second mutation status, based on the MRI scan, a first population atlas for the first mutation status, and a second population atlas for the second mutation status; provide the radiomic feature(s) and the spatial feature descriptor to a machine learning model; and receive, via the machine learning model, a map indicating, for each voxel of the voxels, a probability of the first mutation status for that voxel and a probability of the second mutation status for that voxel, wherein the map is based at least on the one or more radiomic features and the spatial feature descriptor.

27 Claims, 8 Drawing Sheets

SPATIAL-AND-CONTEXT AWARE VIRTUAL BIOPSY RADIOGENOMIC MAPS TO TARGET TUMOR MUTATIONAL STATUS

FEDERAL FUNDING NOTICE

This invention was made with government support under the grant W81XWH-18-1-0404 awarded by the Department of Defense. The government has certain rights in the invention.

BACKGROUND

With treatments for solid cancers transitioning towards personalized therapy, mutational profiling for identifying target gene mutation status or gene amplification status using tissue biopsies is becoming status-quo for most cancers. However, a significant challenge in reliable assessment of gene mutation or amplification status, is the underlying genomic heterogeneity which makes it challenging to identify the "true" mutational status based on random tissue sampling. Multiple studies have shown that certain gene mutations (e.g. MGMT promoter methylation, EGFR) have varying expressions across different parts of the tumor or between primary or secondary metastatic sites.

BRIEF DESCRIPTION OF THE DRAWINGS

The accompanying drawings, which are incorporated in and constitute a part of the specification, illustrate various example operations, apparatus, methods, and other example embodiments of various aspects discussed herein. It will be appreciated that the illustrated element boundaries (e.g., boxes, groups of boxes, or other shapes) in the figures represent one example of the boundaries. One of ordinary skill in the art will appreciate that, in some examples, one element can be designed as multiple elements or that multiple elements can be designed as one element. In some examples, an element shown as an internal component of another element may be implemented as an external component and vice versa. Furthermore, elements may not be drawn to scale.

DETAILED DESCRIPTION

Various embodiments discussed herein can construct and/or employ models to determine a mutation status of a tumor based on a combination of spatial and context information.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic or circuit, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, calculating, determining, and so on, refer to actions and processes of a computer system, logic, circuit, processor, or similar electronic device that manipulates and transforms data represented as physical (electronic) quantities.

Example methods and operations may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components.

Furthermore, additional and/or alternative methodologies can employ additional, not illustrated blocks.

Figure 1:
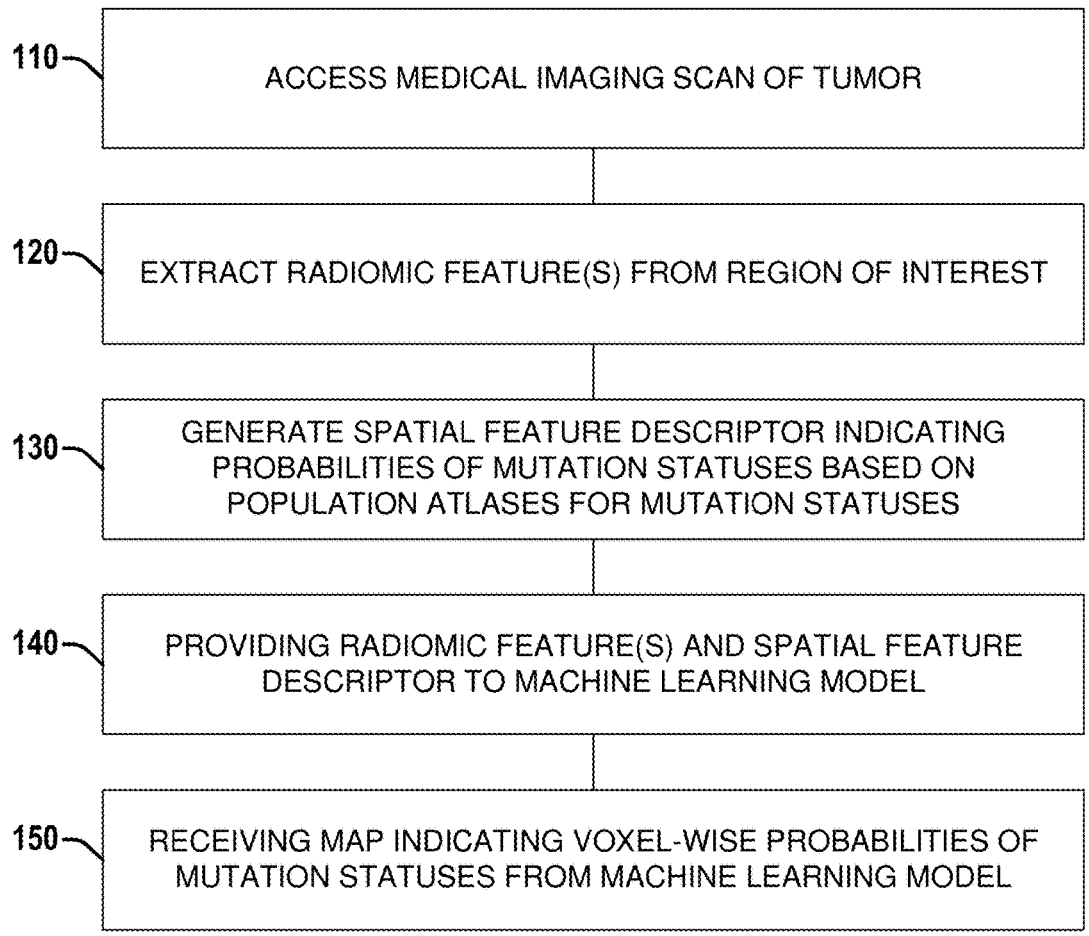
FIG. 1 illustrates a flow diagram of an example method/set of operations that can be performed by one or more processors to determine a mutation status of a tumor based on spatial and context information, according to various aspects discussed herein.

Referring to FIG. 1, illustrated is a flow diagram of an example method/set of operations 100 that can be performed by one or more processors to determine a mutation status of a tumor based on spatial and context information, according to various aspects discussed herein. Processor(s) can include any combination of general-purpose processors and dedicated processors (e.g., graphics processors, application processors, etc.). The one or more processors can be coupled with and/or can include memory or storage and can be configured to execute instructions stored in the memory or storage to enable various apparatus, applications, or operating systems to perform the operations. The memory or storage devices may include main memory, disk storage, or any suitable combination thereof. The memory or storage devices can comprise—but is not limited to—any type of volatile or non-volatile memory such as dynamic random access memory (DRAM), static random-access memory (SRAM), erasable programmable read-only memory (EPROM), electrically erasable programmable read-only memory (EEPROM), Flash memory, or solid-state storage.

The set of operations 100 can comprise, at 110, accessing a medical imaging (e.g., MRI) scan of a tumor comprising a plurality of voxels. In various embodiments and in the example use case discussed below, the imaging scan can be obtained via a system and/or apparatus implementing the set of operations 100, or can be obtained from a separate medical imaging system. Additionally, the imaging scan can be accessed contemporaneously with or at any point prior to performing the set of operations 100.

The set of operations 100 can further comprise, at 120, extracting one or more radiomic features from the plurality of voxels.

The set of operations 100 can further comprise, at 130, generating a spatial feature descriptor indicating a first probability the tumor has a first mutation status and a second probability the tumor has a second mutation status, based on the medical imaging scan, a first population atlas associated with the first mutation status, and a second population atlas associated with the second mutation status.

The set of operations 100 can further comprise, at 140, providing the one or more radiomic features and the spatial feature descriptor to a machine learning model.

The set of operations 100 can further comprise, at 150, receiving, via the machine learning model, a map indicating, for each voxel of the plurality of voxels, a first predicted probability of the first mutation status for that voxel and a second predicted probability of the second mutation status for that voxel, wherein the map is based at least on the one or more radiomic features and the spatial feature descriptor.

Additionally, or alternatively, set of operations 100 can comprise one or more other actions discussed herein in connection with determining a mutation status of a tumor.

Figure 2:
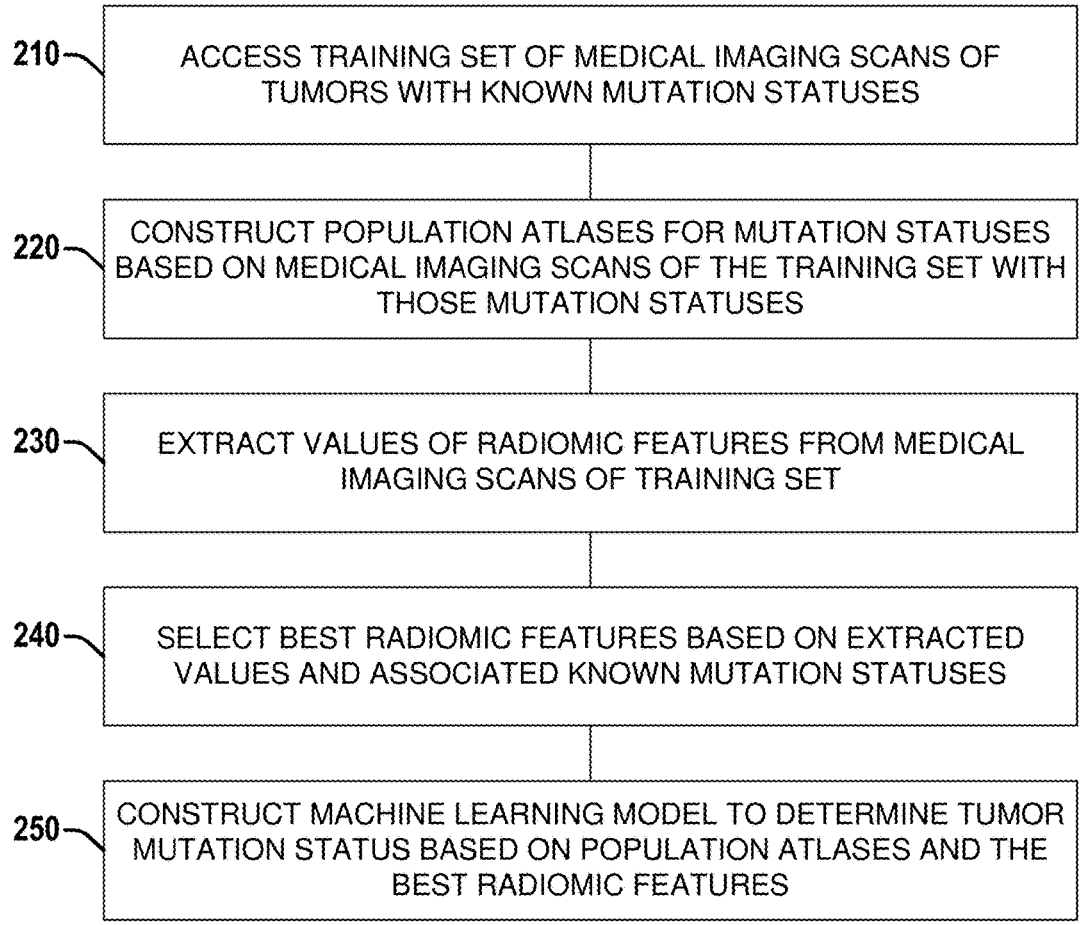
FIG. 2 illustrates a flow diagram of an example method/set of operations that can be performed by one or more processors to construct a model to determine a mutation status of a tumor based on spatial and context information, according to various aspects discussed herein.

Referring to FIG. 2, illustrated is a flow diagram of an example method/set of operations 200 that can be performed by one or more processors to construct a model to determine a mutation status of a tumor based on spatial and context information, according to various aspects discussed herein.

The set of operations 200 can comprise, at 210, accessing a training set of medical imaging scans, wherein each medical imaging scan of the training set comprises an associated tumor associated with a known mutation status for that medical imaging scan, wherein the known mutation status for that medical imaging scan is one of a first mutation status or a second mutation. In various embodiments and in the example use case discussed below, the imaging scans can be obtained via a system and/or apparatus implementing the set of operations 200, or can be obtained from a separate medical imaging system (e.g., MRI system). Additionally, the image volume can be accessed contemporaneously with or at any point prior to performing the set of operations 200.

The set of operations 200 can further comprise, at 220, constructing a first population atlas based on a first subset of the training set and a second population atlas based on a second subset of the training set, wherein the first mutation status is the known mutation status for each medical imaging scan of the first subset and the second mutation status is the known mutation status for each medical imaging scan of the second subset.

The set of operations 200 can further comprise, at 230, for each medical imaging scan of the training set, extracting, for each radiomic feature of a set of radiomic features, an associated value for that radiomic feature from a region of interest of that medical imaging scan.

The set of operations 200 can further comprise, at 240, selecting one or more best radiomic features from the set of radiomic features based on the extracted associated values and known mutation status for each medical imaging scan of the training set.

The set of operations 200 can further comprise, at 250, constructing a machine learning model configured to generate a map indicating, for each voxel of a plurality of voxels of an additional medical imaging scan, a first predicted probability of the first mutation status for that voxel and a second predicted probability of the second mutation status for that voxel, wherein the map is based at least on the one or more best radiomic features, the first population atlas, and the second population atlas.

Additionally, or alternatively, set of operations 200 can comprise one or more other actions discussed herein in connection with constructing a model to determine a mutation status of a tumor based on spatial and context information.

Additional aspects and embodiments are discussed below in connection with the following example use case.

Example Use Case: Spatial-And-Context Aware (SpACe) "Virtual Biopsy" Radiogenomic Maps to Target Tumor Mutational Status on Structural MRI The following discussion provides example embodiments in connection with an example use case involving determination of a mutation status of a tumor based on a combination of context feature(s) from regions of interest and spatial prior(s) from population atlas(es). Although the example use case specifically applies techniques discussed herein to glioblastoma (GBM), these techniques can also be applied to other cancers with regional genetic heterogeneity, such as colorectal cancer, breast cancer, etc.

With growing emphasis on personalized cancer-therapies, radiogenomics has shown promise in identifying target tumor mutational status on routine imaging (e.g., MRI) scans. These approaches largely fall into two categories: (1) deep-learning/radiomics (context-based) that employ image features from the entire tumor to identify the gene mutation status, or (2) atlas (spatial)-based to obtain likelihood of gene mutation status based on population statistics. While many genes (e.g., EGFR, MGMT, etc.) are spatially variant, a significant challenge in reliable assessment of gene mutation status on imaging is the lack of available co-localized ground truth for training the models. The example use case presents Spatial-And-Context aware (SpACe) "virtual biopsy" maps that incorporate context features from co-localized biopsy sites along with spatial-priors from population atlases, within a Least Absolute Shrinkage and Selection Operator (LASSO) regression model, to obtain a per-voxel probability of the presence of a mutation status ($M^+$ vs. $M^-$). A probabilistic pair-wise Markov model was then used to improve the voxel-wise prediction probability. The efficacy of SpACe maps was evaluated on MRI scans with co-localized ground truth obtained from biopsy, to predict the mutation status of 2 driver genes in Glioblastoma (GBM): (1) $EGFR^+$ versus $EGFR^-$, (n=91), and (2) $MGMT^+$ versus $MGMT^-$, (n=81). When compared against state-of-the-art deep-learning (DL) and radiomic models, SpACe maps obtained training and testing accuracies of 90% (n=70) and 90.48% (n=21) in identifying EGFR amplification status, compared to 80% and 71.4% via radiomics, and 74.28% and 65.5% via DL. For MGMT methylation status, training and testing accuracies using SpACe were 88.3% (n=60) and 71.5% (n=21), compared to 52.4% and 66.7% using radiomics, and 79.3% and 68.4% using DL. Following validation, SpACe maps could provide surgical navigation to improve localization of sampling sites for targeting of specific driver genes in cancer.

1. Overview

With treatments for solid cancers transitioning towards personalized therapy, mutational profiling for identifying target gene mutation status or gene amplification status using tissue biopsies is becoming status-quo for most cancers. However, a significant challenge in reliable assessment of gene mutation or amplification status is the underlying genomic heterogeneity which makes it challenging to identify the "true" mutational status based on random tissue sampling. Multiple studies have shown that certain gene mutations (e.g. MGMT promoter methylation, EGFR) have varying expressions across different parts of the tumor or between primary or secondary metastatic sites. Accordingly, it can be advantageous to employ "virtual biopsy" techniques on imaging according to the example use case, which can comprehensively capture the gene mutation heterogeneity of solid tumors, and potentially assist in surgical navigation to identify sampling sites for biopsy targeting.

The field of radiogenomics has provided a surrogate mechanism to predict gene mutational status on routine imaging (e.g., MRI) by training machine-learning models. Most of the existing radiogenomic models fall in two categories: (1) deep learning/radiomics, and (2) atlas-based probabilistic approaches. In the absence of co-localized biopsy sites on MRI, deep learning/radiomic approaches employ features from the entire tumor to predict the gene mutational status. In contrast, atlas-based approaches obtain the likelihood of the mutational status of driver genes such as MGMT and EGFR at different spatial locations by creating probabilistic radiographic atlases obtained from a large population. These population-based approaches however do not leverage any tumor-specific information in the model.

Figure 3:
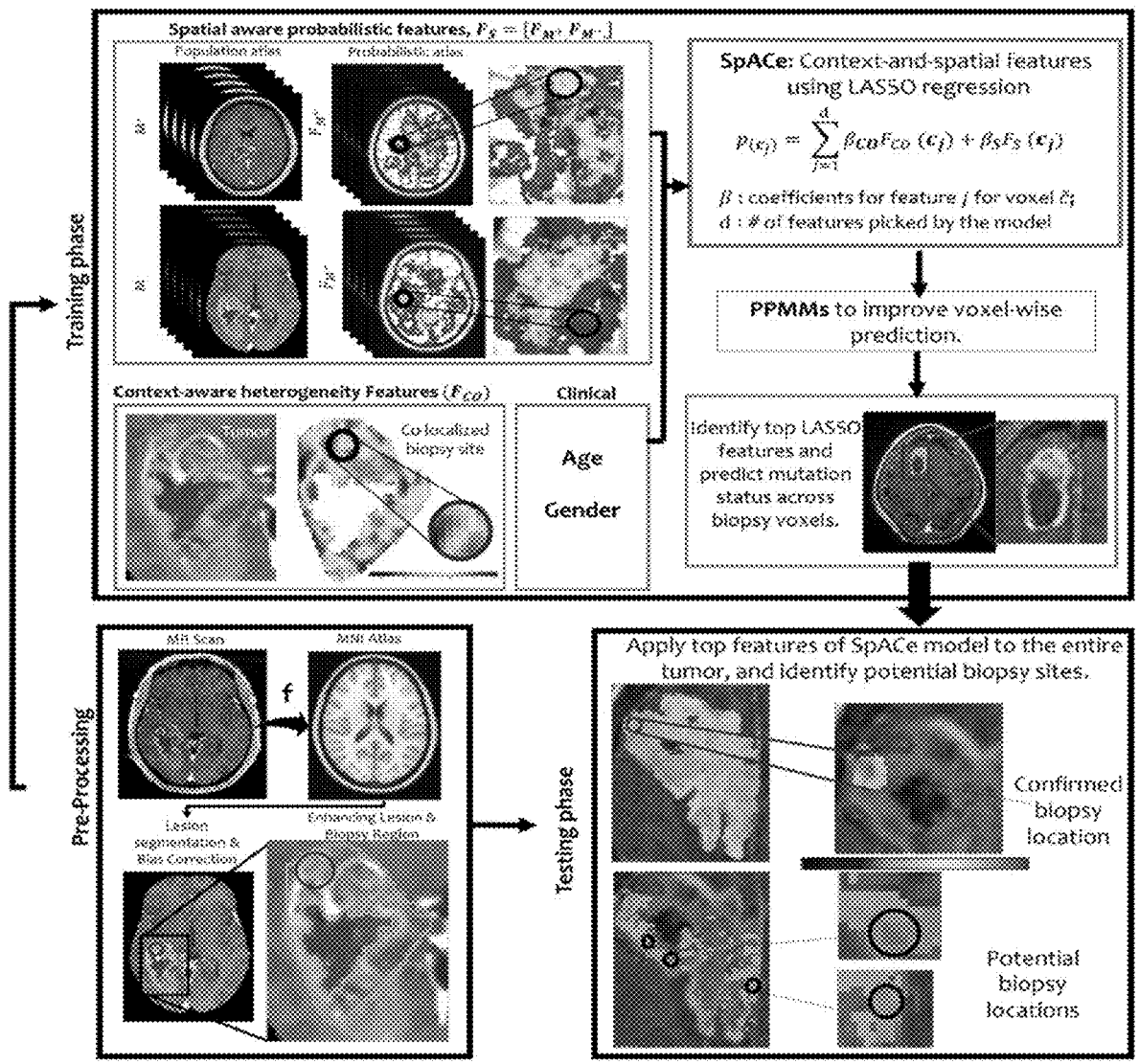
FIG. 3 illustrates a diagram and example images showing an overview of the workflow for the example use case to create "virtual biopsy" maps, in connection with various aspects discussed herein.

The example use case presented the first attempt at creating "virtual biopsy" radiogenomic maps for predicting gene mutational status on MRI, by combining two complementary attributes that capture mutational heterogeneity at: (1) population-level via spatial-priors for presence or absence of mutation status ($M^+$, $M^-$) using probabilistic atlases from a retrospective cohort, and (2) local tumor-level by incorporating context-priors that capture mutational heterogeneity via radiomic attributes obtained from a stereotactically co-localized biopsy site within the tumor. The spatial and context priors were combined within a Least Absolute Shrinkage and Selection Operator (LASSO) regression model to obtain a per-voxel probability of the likelihood of increased expression of the gene mutation ($M^+$, $M^-$) at that location. The prediction probabilities obtained for every voxel are further improved using probabilistic pairwise Markov models. The example use case evaluated these Spatial and Context Aware (SpACe) maps in the context of two problems in Glioblastoma (GBM): (1) predicting EGFR status (amplified (EGFR$^+$), non-amplified (EGFR$^-$)), and (2) predicting MGMT status (methylated (MGMT$^+$), non-methylated (MGMT$^-$)), from routine MRI scans (in various embodiments, similar techniques can be applied to other solid tumors, with relevant mutational status(es)). Referring to FIG. 3, illustrated is a diagram and example images showing an overview of the workflow for the example use case to create "virtual biopsy" maps, in connection with various aspects discussed herein. FIG. 3 shows acts involved in pre-processing, training, and testing phases of the example use case, each of which are discussed in greater detail below.

2. Methods

2.1 Notation

An image scene I was defined as I=(C, f), where I is a spatial grid C of voxels $c \in C$, in a 3D space, $\mathbb{R}^3$. Each voxel $c \in C$ is associated with an intensity value f=(c). $I_B$ represents the co-localized biopsy location on MRI scans, such that $I_B \subset I$. $\mathbb{F}(c)$ denotes the features set obtained for every $c \in C_B$. For gene M, $M^+$ defines amplified/methylated, while $M^-$ defines non-amplified/unmethylated.

2.2 Computing Context-Aware Mutational Heterogeneity from Stereotactic Biopsy Locations ($\mathbb{F}_{CC}$)

"Context" was defined as local heterogeneity attributes computed from the co-localized biopsy site on imaging, using radiomic features (e.g., which can comprise one or more of Haralick features, which capture image heterogeneity; Gabor features, which capture structural details at different orientations and scales; Laws features, which capture spots and ripple-like patterns; CoLlAGe features, which capture localized gradient orientation changes; or other features). Specifically, for every $c \in C_B$, the example use case extracted a set of 3D radiomic features (e.g., comprising Haralick, Gabor, Laws, CoLlAGe). $\mathbb{F}_\theta^k(c)$ was defined, where θ is the type of feature family (e.g. Haralick, Gabor), and $k \in \{1, \ldots, n\}$, where n is the number of feature attributes for every feature family. Feature pruning was then conducted on the extracted features using Spearman's correlation metric to eliminate redundant features. The pruned "context-aware" features (152 for EGFR cohort, 149 for MGMT cohort) were finally aggregated into one feature descriptor $\mathbb{F}_{CC}$.

2.3 Computing Spatially-Aware Priors ($\mathbb{F}_S$) for Likelihood of Gene Mutation Status ($M^+$, $M^-$) Using Probabilistic Atlases Using the lesion segmentation obtained for every patient in the training set, two different population atlases for gene M were constructed using subjects that belong to either $M^+$ or $M^-$. This was done to quantify the frequency of occurrence of every voxel across $M^+$ and $M^-$, and compute voxel-wise probability values, $P_w(c)$, $w \in (M^+, M^-)$. All scans were first registered to an isotropic reference atlas (i.e., MNI152; Montreal Neurological Institute). The intensity values were then averaged across $c \in C$ across all the annotated binary images of all patients involved in the study. This means that for $c \in C$, two probability values from these two atlases could be obtained, characterizing the probability of a voxel c being $M^+$ or $M^-$. The 2 probability values ($P_{M^+}$, $P_{M^-}$) for every voxel $c \in C$ were finally aggregated in the spatial feature descriptor $\mathbb{F}_S = [P_{M^+}, P_{M^-}]$.

2.4 Creating SpACe maps for Predicting Voxel-wise Mutational Heterogeneity in the Tumor In order to obtain a voxel-wise prediction p(c) of the gene mutation status, the context descriptor ($\mathbb{F}_{CC}$), spatial descriptor ($\mathbb{F}_S$), age ($\mathbb{F}_A$), and gender ($\mathbb{F}_G$) of every patient in the training set, are incorporated within a LASSO model. A LASSO model was selected to obtain the probability score using a parsimonious feature set by utilizing its capability in reducing variance when shrinking features, while simultaneously not increasing the bias. The model optimizes weights for all feature variables simultaneously across cross validation, with enforcing balance of the two classes. The LASSO model of the example use case was designed to perform regularization of feature parameters as follows:

$[\hat{\beta}]=\operatorname{argmin}\{|y-F_{CO}\beta_{CO}|^2+\lambda_{CO}|\beta_{CO}|+|y-F_S\beta_S|^2+\lambda_S|\beta_S|+|y-F_A\beta_A|^2+\lambda_A|\beta_A|+|y-F_G\beta_G|^2+\lambda_G|\beta_G|\}$, where $[\hat{\beta}]=\{\hat{\beta}_1, \ldots, \hat{\beta}_d\}$ is the shrunken set of d coefficients obtained after regularization, and $y\in[M^+,M^-]$. Feature shrinkage was handled by optimizing the penalty term A, by minimizing mean cross-validation error across 10 folds. The voxel-wise probability was then computed as the weighted sum of the selected features for the set of coefficients $[\hat{\beta}]$, as follows:

$$p_{SpACe}(c) = \sum_{j=1}^{d} \hat{\beta}_j \mathbb{F}_j(c),$$

where $j \in \{1, \ldots d\}$, and d is the number of features selected by LASSO. After obtaining the probabilistic map for every $c \in C_B$, probabilistic pairwise Markov models (PPMMs) were incorporated to improve voxel-wise gene mutation prediction. PPMMs were adopted from Markov Random Fields, through formulating priors in terms of probability density functions instead of potential functions, hence allowing the creation of more robust prediction models. To effectively model the tendency of nearby voxels to share the same class (e.g., gene mutation status $M^+$ or $M^-$), probabilistic pairwise Markov models can be used. Unlike the typical MRF formulations which express local conditional probability functions in terms of clique potentials, PPMMs represent the local conditional probability density functions (LCPDFs) using probability functions. These probability functions immediately provide insight into the expected behavior of the resulting MRF and suggest means for creating more sophisticated models. The input to this model is the voxel-wise probability values obtained from the LASSO model. Interaction between neighboring sites is then modelled, to improve voxel-wise probability scores, and to finally obtain $\mathbb{F}_{SpACe}$ maps.

2.5 Applying SpACe Maps on Testing Sets for Predicting Voxel-Wise Mutational Heterogeneity within the Tumor The top features selected on the training set were applied to the entire tumor on the test set, for obtaining voxel-wise probabilities for predicting the mutational status. For the purpose of computing accuracy of the model, the mutation status $[M^+, M^-]$ was predicted based on pooled probability values for an already known biopsy site, and the prediction was compared with the known mutation status. As an additional qualitative analysis, the probabilities values obtained from the entire tumor were thresholded (with an empirically obtained threshold), followed by connected component analysis and PPMM, to obtain 2-3 hot-spots of high probability mutation sites. These hot-spots prospectively could be used to drive surgical navigation as potential sites for biopsy location.

3. Experimental Design 3.1 Data Description and Preprocessing

The example use case employed a unique retrospective dataset of a total of 100 GBM patients who underwent CT-guided biopsy for disease confirmation, since surgical resection was not feasible (due to location or other clinical reasons) for these patients. Segmentation of the enhancing lesion was conducted by an experienced radiologist on the MR scans. The biopsy site was co-localized by co-registering CT images with the MRI scans, followed by expert evaluation for confirmation. All scans were then registered to an MNI152 atlas and then bias-corrected using N4 bias correction. These studies were divided into two cohorts: (a) $S_1$: EGFR amplified (EGFR$^+$) versus non-amplified (EGFR$^-$) studies, and (2) $S_2$: MGMT methylated (MGMT$^+$) versus unmethylated (MGMT$^-$). For $S_1$, there were a total of 91 subjects of which 70 were used for training (35 amplified, 35 non-amplified), and the remaining 21 (6 EGFR$^+$, 15 EGFR$^-$) were used for validation. For $S_2$, of a total of 81 subjects, 60 (28 MGMT$^+$, 32 MGMT$^-$) were used for training, while 21 subjects were used for validation (5 MGMT$^+$, 16 MGMT$^-$). The methylation status for MGMT was obtained from formalin-fixed, paraffin-embedded biopsy tissue using real-time quantitative (RT-q) PCR, while EGFR amplification status was obtained using fluorescence in situ hybridization (FISH).

3.2 Implementation Details

Two experiments were set-up using cohorts $S_1$ (Experiment 1: EGFR$^+$ versus EGFR$^-$) and $S_2$ (Experiment 2: MGMT$^+$ versus MGMT$^-$), respectively. For both experiments, a total of 316 3D context features were extracted for every $c \in C_B$ (where $C_B$ was a 1-cm diameter sphere in the example use case), including 1 raw feature, 8 gray features, 13 gradient features, 26 Haralick features, 64 Gabor features, 152 Laws features, and 52 CoLlAGe features, extracted using 2 window sizes $w=3\times3$ and $w=5\times5$. These features are pruned as detailed in section 2.2, above, to obtain $\mathbb{F}_{CB}$. In addition, population atlases were constructed to quantify the frequency of occurrence of EGFR$^+$ versus EGFR$^-$ and MGMT$^+$ versus MGMT$^-$ as detailed in section 2.3, above. Similarly, for both experiments, $\mathbb{F}_{SpACe}$ was created following 10 runs of 10-fold cross validation, as detailed in section 2.4, above. The median value of the probabilities across voxels of all subjects was used as a threshold to determine $M^+$, $M^-$ for every voxel. Finally, majority voting was used to obtain the mutation status for every biopsy site.

In other embodiments, however, alternative techniques (e.g., Bayesian consensus, Dempster-Shafer's Theory of Evidence, etc.) can be employed instead of majority voting to obtain the predicted mutation status. Bayesian consensus with discrete probability distributions applies the Bayes' theorem in an iterative way to estimate the probability that samples belong to a specific class on the basis of each analytical source and then combine these probabilities into a joint probability. Dempster-Shafer's Theory of Evidence is a generalization of the Bayesian methods, but it offers greater flexibility when quantifying weak evidence and its associated uncertainties. Dempster-Shafer's Theory of Evidence considers conflicting information in a different way and can be used to augment knowledge representation with statistical measures that describe the levels of evidence and belief.

3.3 Comparative Strategies

In order to evaluate the efficacy of SpACe model, the results were compared with two state-of-the-art methods: (1) radiomic-based, and (2) deep-learning-based that employ features from the entire tumor to predict amplification/methylation status. For the radiomic experiment ($\mathbb{F}_{Rad}$), a total of 316 radiomic features were extracted from the entire enhancing lesion of every subject (the same attributes that were extracted from biopsy sites), and the feature vector was constructed from the 4 statistics: median, variance, skewness, and kurtosis values that were computed for every feature across all voxels for this patient, for a total of 1264 features. After feature pruning, 283 features were fed to the LASSO model to compute patient-wise scores that determined their gene status.

For the DL approach ($\mathbb{F}_{DL}$) to predict the mutation status, a deep residual neural network was used. ResNet has previously been used to predict EGFR and MGMT mutation in GBM and other cancers. Specifically, patches of size 128×128 were sampled from the center of the selected MRI slices and augmented using horizontal flips and random rotations to enlarge the limited training data. Following patch sampling, separate deep ResNet networks with 18 layers (ResNet-18) were trained for the two experiments, which does optimization via stochastic gradient. In order to train the networks on MRI scans, a pre-trained model was used on ImageNet and transfer learning was performed using the sampled patches from MRI scans. ResNet-18 was selected because it removes the vanishing gradient problem and the network has several layers containing composite function of operations such as batch normalization (BN), convolution (Cony), rectified linear units (ReLU), and pooling for non-linear transformation of the input. Each model was trained for 25 epochs with dropout values ranging from 0:1-0:5 based on minimum validation loss, to avoid overfitting. Models with minimum loss were locked down to test the patches obtained from the test set.

4. Results and Discussion 4.1 Experiment 1: Determining EGFR Amplification Status Using $\mathbb{F}_{CC}$ alone, training and testing accuracies were reported as 61.43% and 66.67% respectively. The combination of $\mathbb{F}_{CC}$ features with $\mathbb{F}_S$ features into the LASSO model yielded training and testing accuracies of 80% and 90.48% respectively, using 8 $\mathbb{F}_{CC}$ (1 raw, 1 gray, 2 gradient, 1 Haralick, 3 Gabor) and 2 $\mathbb{F}_S$ features. This implies that incorporating $\mathbb{F}_S$ improved the model's performance, rather than using $\mathbb{F}_{CC}$ alone. Next, we evaluated the efficacy of including $\mathbb{F}_{CC}$, $\mathbb{F}_S$, and clinical features (e.g., $\mathbb{F}_A$, $\mathbb{F}_G$) into the model to predict the mutation status. Clinical features did not improve accuracy of the model. PPMMs were then employed, and successfully corrected the amplification status for 7 subjects from the training set, yielding final training and testing accuracies of 90% (1 amplified, 6 non-amplified subjects were misclassified out of 70) and 90.48% (2 non-amplified subjects were misclassified out of 21) respectively. This is compared to training and testing accuracies of 80% and 90.48% without applying PPMMs, which implies that PPMMs substantially improves the diagnostic performance. The example use case also calculated both the area under curve (AUC) and the area under the precision-recall curve (AUPRC), for both training and testing sets. AUPRC is known to efficiently handle imbalance of classes, which was the case for the test sets in the example use case. AUCs for EGFR amplification prediction on training and test sets were 0.78 and 0.8 respectively, while AUPRCs were 0.76 and 0.7 respectively.

Figure 4:
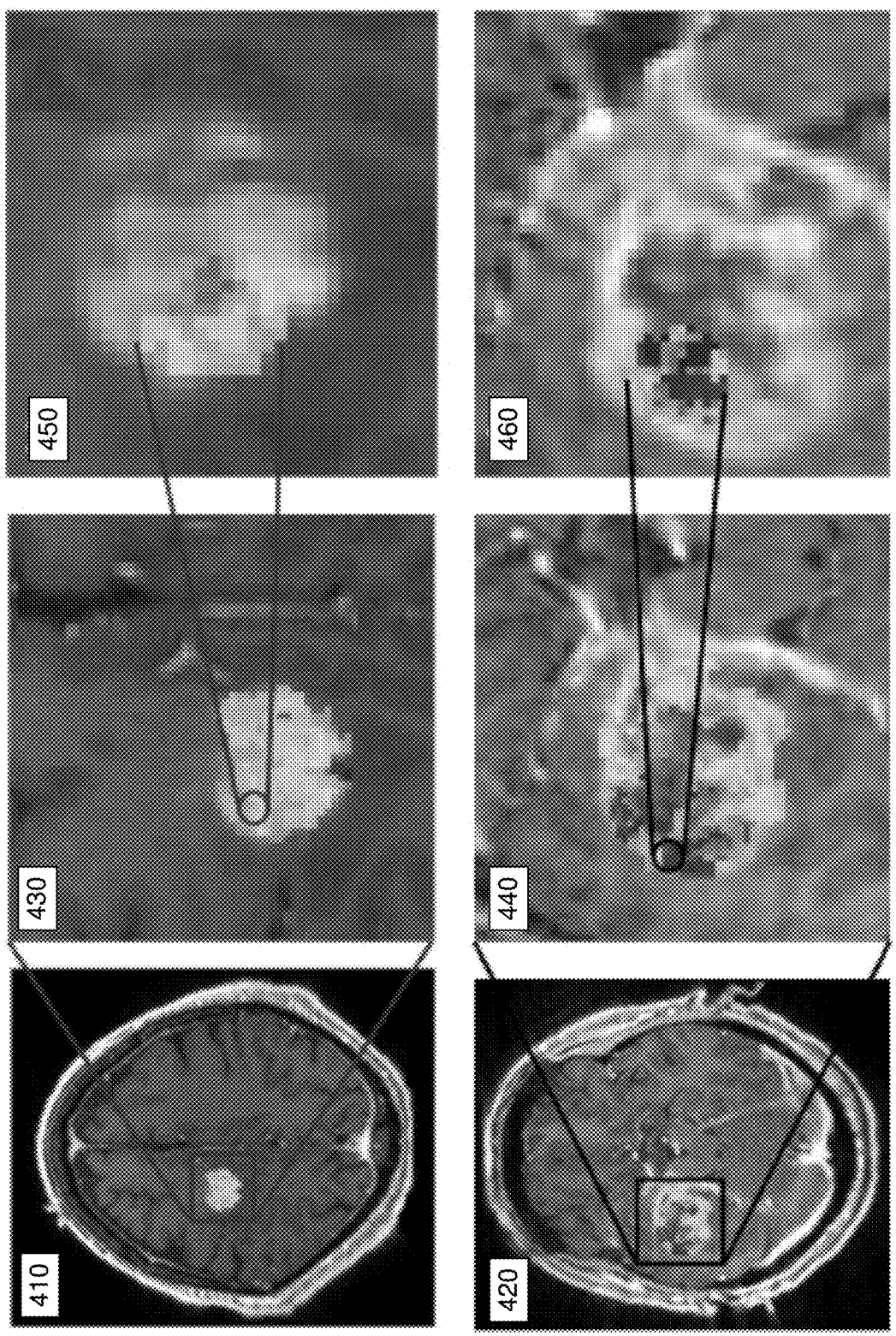
FIG. 4 illustrates example images showing results for two different patients in the first experiment, in connection with various aspects discussed herein.
Figure 5:
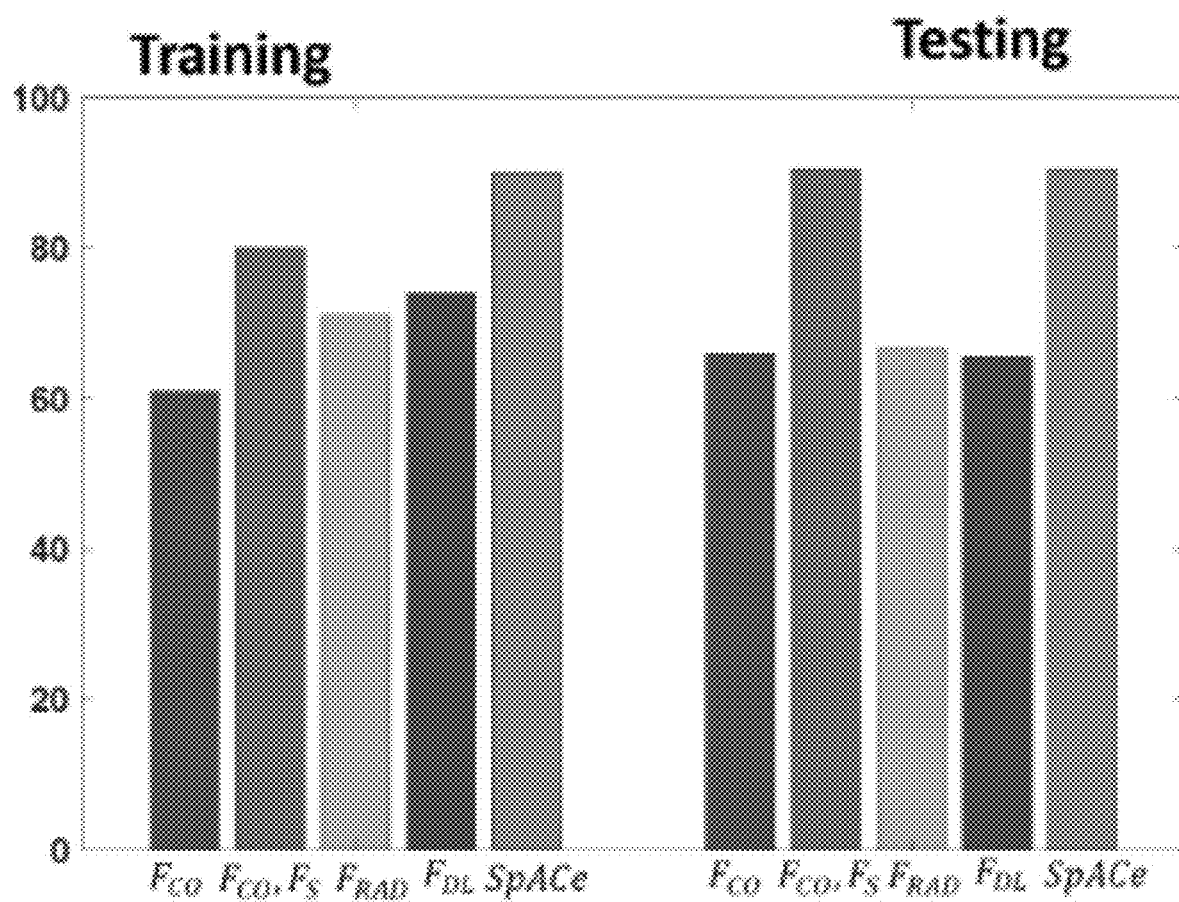
FIG. 5 illustrates a bar graph with accuracies for both training and testing sets for EGFR$^+$ versus EGFR$^-$, using various models, in connection with various aspects discussed herein.

Referring to FIG. 4, illustrated are example images showing results for 2 different patients in the first experiment, in connection with various aspects discussed herein. FIG. 4 shows EGFR⁺ (410) and EGFR⁻ (420) cases with voxel-wise probabilities calculated using SpACe maps. Heatmaps with voxel-wise probabilities for the entire tumor area for EGFR⁺ (430) and EGFR⁻ (440) are shown, where "red" represents the amplified and "blue" represents the un-amplified status. Confirmed biopsy sites are enclosed by a circle. Images 450 and 460 show biopsy region heatmaps, which confirm the mutation status of the tumor. The tumor heatmaps in 430 and 440 show other clusters that could be potential candidates for biopsy sites. The prediction accuracies for predicting mutation status in the two patients in 410 and 420 using SpACe were 92.5% and 96% respectively. Referring to FIG. 5, illustrated is a bar graph with accuracies for both training and testing sets for EGFR⁺ versus EGFR⁻, using $\mathbb{F}_{CC}$, [$\mathbb{F}_{CC} \cdot \mathbb{F}_S$], $\mathbb{F}_{Rad}$, $\mathbb{F}_{DL}$, and $\mathbb{F}_{SpACe}$, in connection with various aspects discussed herein.

Using radiomic features from the entire tumor to predict mutation status yielded training and testing accuracies of 80% and 71.43% respectively. Further, the ResNet model to predict EGFR status yielded training and testing accuracies of 74.28% and 65.52%, significantly underperforming in comparison to the SpACe model.

4.2 Experiment 2: Determining MGMT Methylation Status

Using $\mathbb{F}_{CC}$ alone, the model achieved training and testing accuracies of 76.67% and 57.14% respectively. When combining $\mathbb{F}_{CC}$ features with $\mathbb{F}_{CC}$ features into LASSO model, we obtained training and testing accuracies of 81.67% and 61.9% respectively, which implies that incorporating $\mathbb{F}_{CC}$ improved the model's performance, rather than using $\mathbb{F}_{CC}$ alone. Next, using $\mathbb{F}_{CC}$, $\mathbb{F}_{CC}$, and clinical features, the model picked a set of 12 features that included 8 $\mathbb{F}_{CC}$ features; 1 gray, 3 Haralick, and 4 Gabor features, in addition to $P_{MGMT^+}$, $P_{MGMT^-}$, $\mathbb{F}_A$, and $\mathbb{F}_G$. This model yielded training and testing accuracies of 83.3% and 66.67% respectively. Applying PPMMs for predicting methylation status on these results corrected the mutation status for 3 training subjects as well as 1 testing subject, with final accuracies of 88.3% and 71.5% respectively, compared to training and testing accuracies of 82% and 67% without applying PPMMs. AUCs for MGMT methylation prediction on training and test sets were 0.75 and 0.71 respectively, and AUPRCs were 0.72 and 0.69 respectively.

Figure 6:
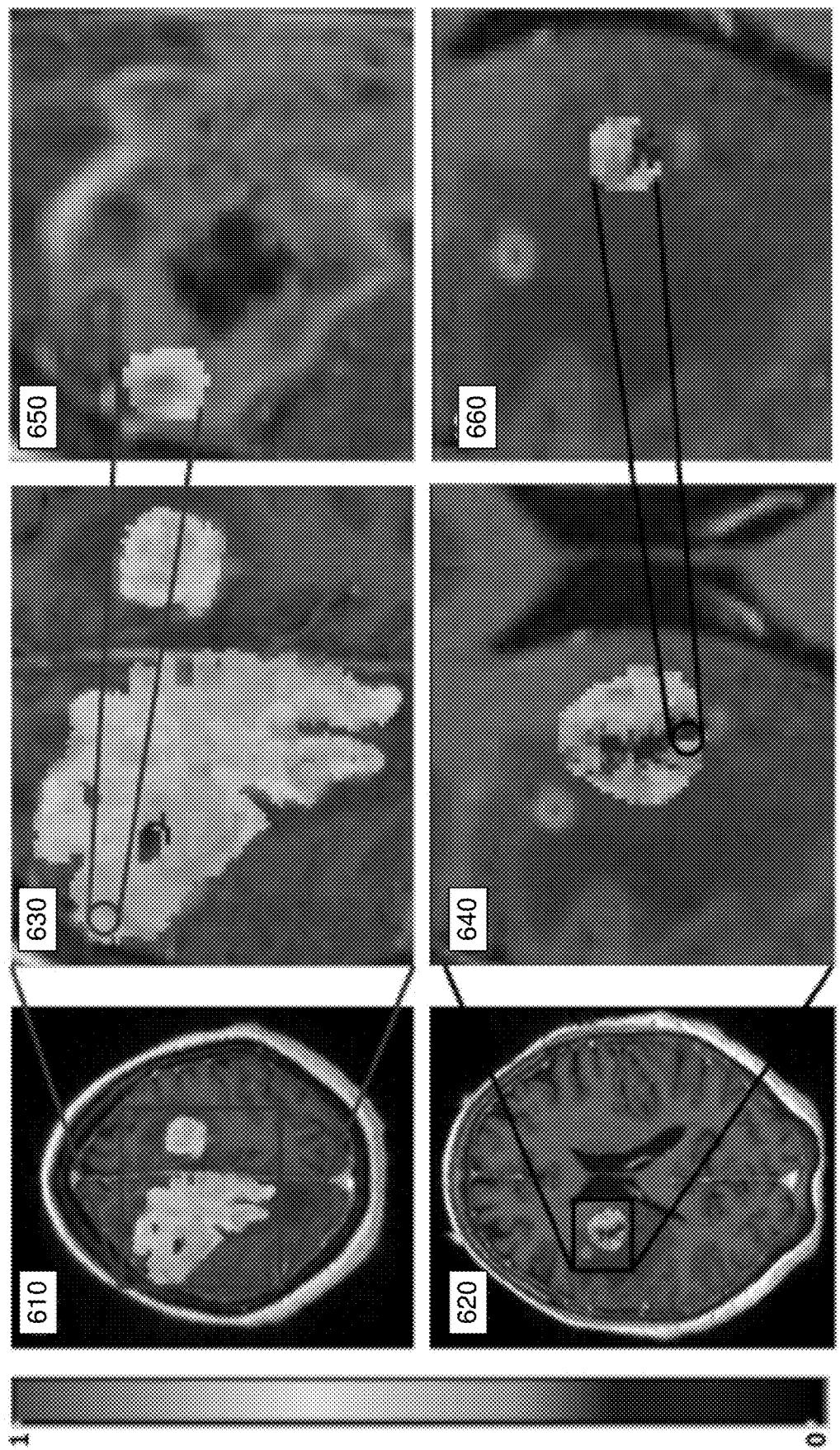
FIG. 6 illustrates example images showing results for two different patients in the second experiment, in connection with various aspects discussed herein.
Figure 7:
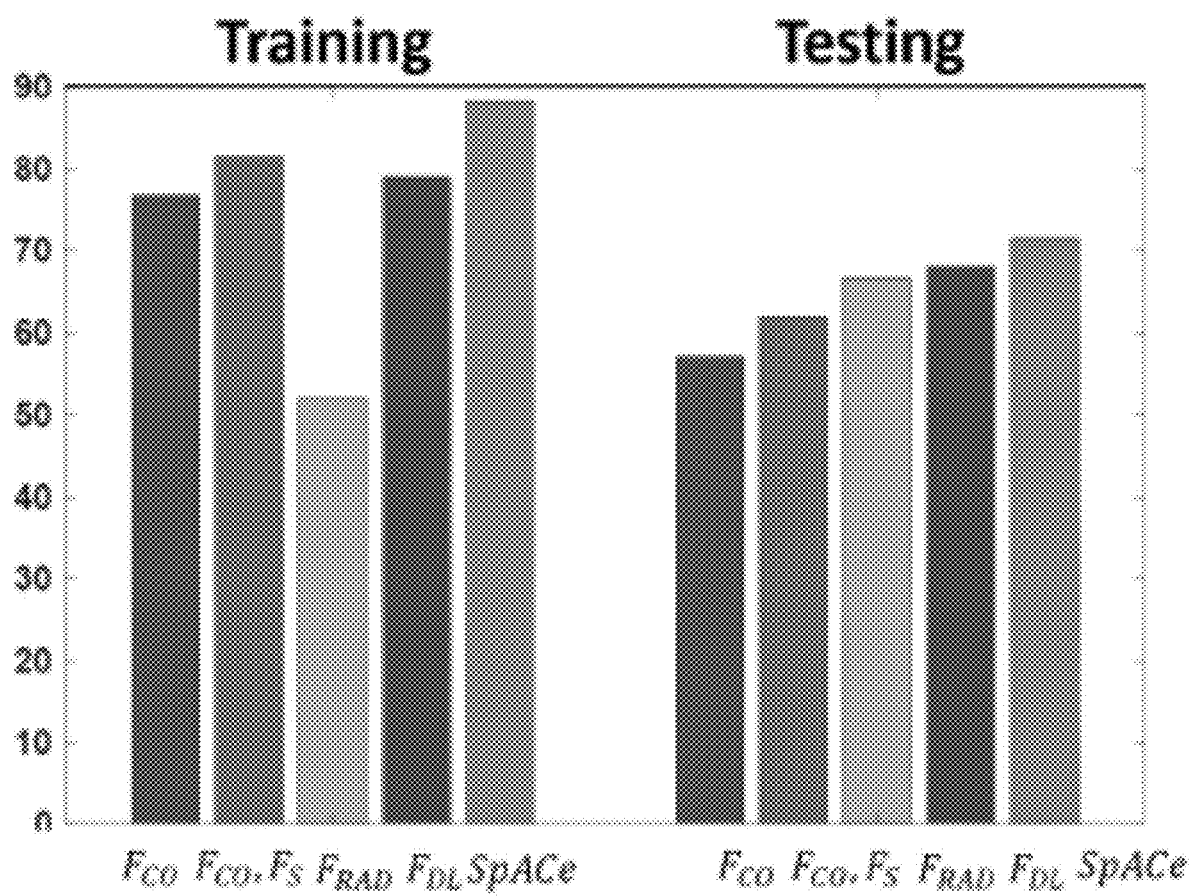
FIG. 7 illustrates a bar graph with accuracies for both training and testing sets for MGMT$^+$ versus MGMT$^-$, using various models, in connection with various aspects discussed herein.

Referring to FIG. 6, illustrated are example images showing results for 2 different patients in the second experiment, in connection with various aspects discussed herein. FIG. 6 shows MGMT⁺ (610) and MGMT⁻ (620) cases with voxel-wise probabilities calculated using SpACe maps. Heatmaps with voxel-wise probabilities for the entire tumor area for MGMT⁺ (630) and MGMT⁻ (640) are shown, where "red" represents the methylated and "blue" represents the unmethylated status. Confirmed biopsy sites are enclosed by a circle. Images 650 and 660 show biopsy region heatmaps, which confirm the mutation status of the tumor. The tumor heatmaps in 630 and 640 show other clusters that could be potential candidates for biopsy sites. The prediction accuracies for predicting mutation status in the two patients in 610 and 620 using SpACe were 98% and 99% respectively. Referring to FIG. 7, illustrated is a bar graph with accuracies for both training and testing sets for MGMT⁺ versus MGMT⁻, using $\mathbb{F}_{CC}$, [$\mathbb{F}_{CC} \cdot \mathbb{F}_{CC}$] $\mathbb{F}_{Rad}$, $\mathbb{F}$ DL, and $\mathbb{F}_{SpACe}$, in connection with various aspects discussed herein.

When using radiomic features from the entire tumor to predict methylation status, training and testing accuracies were 76.67% and 52.38%. In addition, the DL model that was trained to predict methylation status gave training and testing accuracies of 79.37% and 68.40%, suggesting that results obtained using SpACe maps outperformed both comparative approaches.

5. Conclusion

The example use case presented the first attempt at creating "virtual biopsy" radiogenomic maps for predicting gene mutational status on MRI, by combining two complementary attributes: (1) spatial-priors for presence or absence of mutation status via probabilistic atlases from a retrospective cohort, and (2) context-priors to capture mutational heterogeneity using radiomic attributes obtained from a stereotactically co-localized biopsy site within the tumor. These spatial-and-context aware (SpACe) maps were evaluated in the context of two experiments: predicting (1) EGFR amplification status, and (2) MGMT methylation status, on Glioblastoma. The results demonstrated that SpACe outperformed state-of-the-art radiomic and deep learning approaches that were performed on the entire tumor, instead of learning features from the co-localized biopsy site. The virtual biopsy maps created using SpACe could not only improve prediction of gene mutation status of the tumor, but could also serve as surgical navigation to guide potential biopsy sites for specific gene mutations.

Additional Embodiments

In various example embodiments, method(s) discussed herein can be implemented as computer executable instructions. Thus, in various embodiments, a computer-readable storage device can store computer executable instructions that, when executed by a machine (e.g., computer, processor), cause the machine to perform methods or operations described or claimed herein including operation(s) described in connection with methods 100, 200, or any other methods or operations described herein. While executable instructions associated with the listed methods are described as being stored on a computer-readable storage device, it is to be appreciated that executable instructions associated with other example methods or operations described or claimed herein can also be stored on a computer-readable storage device. In different embodiments, the example methods or operations described herein can be triggered in different ways. In one embodiment, a method or operation can be triggered manually by a user. In another example, a method or operation can be triggered automatically.

Embodiments discussed herein relate to training and/or employing models to determine a tumor mutational status based at least in part on spatial and context features that are not perceivable by the human eye, and involve computation that cannot be practically performed in the human mind. As one example, machine learning models as described herein cannot be implemented in the human mind or with pencil and paper. Embodiments thus perform actions, steps, processes, or other actions that are not practically performed in the human mind, at least because they require a processor or circuitry to access digitized images stored in a computer memory and to extract or compute features that are based on the digitized images and not on properties of tissue or the images that are perceivable by the human eye. Embodiments described herein can use a combined order of specific rules, elements, operations, or components that render information into a specific format that can then be used and applied to create desired results more accurately, more consistently, and with greater reliability than existing approaches, thereby producing the technical effect of improving the performance of the machine, computer, or system with which embodiments are implemented.

Figure 8:
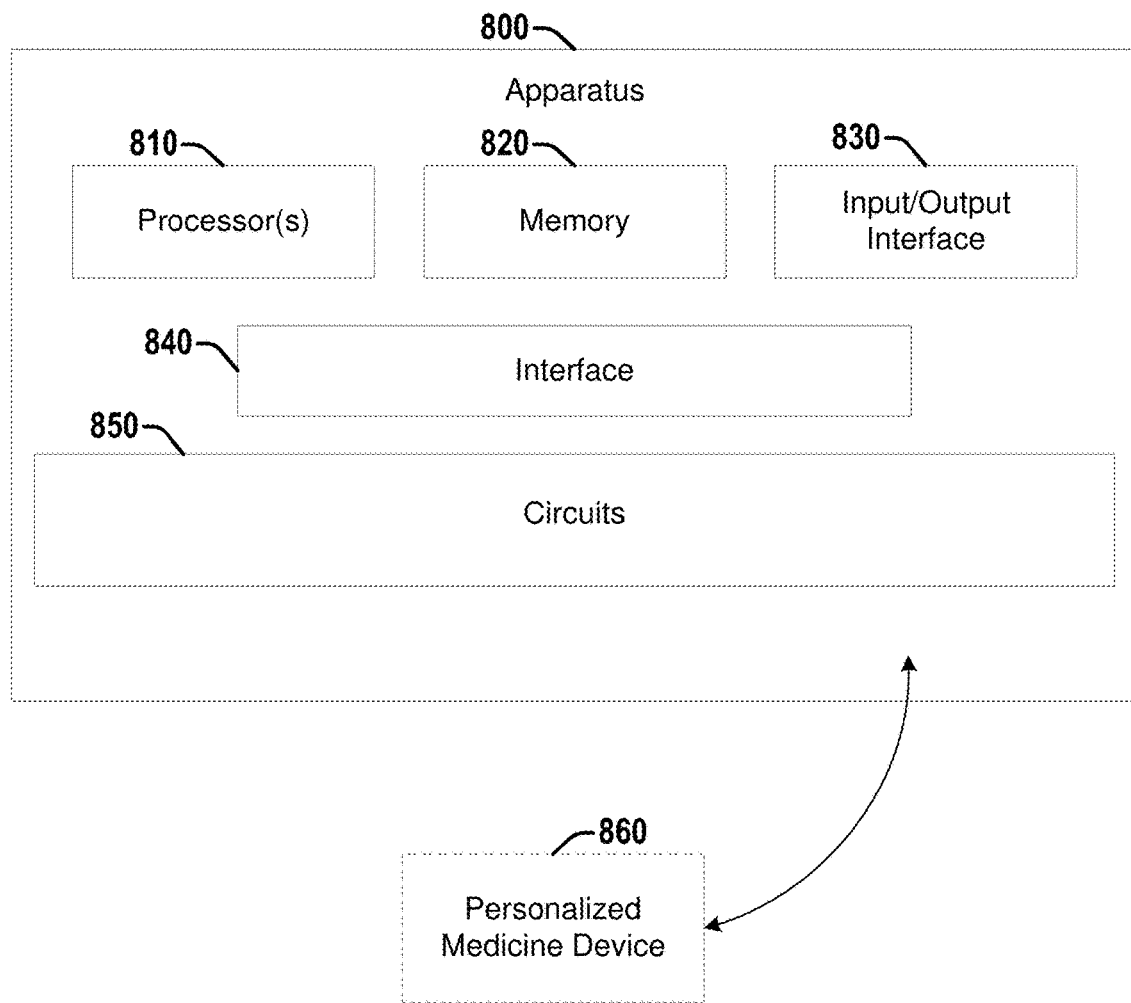
FIG. 8 illustrates a diagram of an example apparatus that can facilitate determination of a mutational status for a tumor based on spatial and context information and/or construct a machine learning (ML) classifier to perform such a determination, according to various embodiments discussed herein.

Referring to FIG. 8, illustrated is a diagram of an example apparatus 800 that can facilitate determination of a mutational status for a tumor based on spatial and context information and/or construct a machine learning (ML) classifier to perform such a determination, according to various embodiments discussed herein. Apparatus 800 can be configured to perform various techniques discussed herein, for example, various operations discussed in connection with sets of operations 100, 200, and/or other methods described herein. Apparatus 800 can comprise one or more processors 810 and memory 820. Processor(s) 810 can, in various embodiments, comprise circuitry such as, but not limited to, one or more single-core or multi-core processors. Processor(s) 810 can include any combination of general-purpose processors and dedicated processors (e.g., graphics processors, application processors, etc.). The processor(s) can be coupled with and/or can comprise memory (e.g., of memory 820) or storage and can be configured to execute instructions stored in the memory 820 or storage to enable various apparatus, applications, or operating systems to perform operations and/or methods discussed herein. Memory 820 can be configured to store one or more medical image volumes (e.g., obtained via MRI, CT, etc.) of a tumor (e.g., for training and/or determining a mutational status). Each of the image(s) can comprise a plurality of pixels or voxels, each pixel or voxel having an associated intensity. Memory 820 can be further configured to store additional data involved in performing operations discussed herein, such as for determining a mutational status of a tumor based on spatial and context information and/or training a to determine such a mutational status, as discussed in greater detail herein.

Apparatus 800 can also comprise an input/output (I/O) interface 830 (e.g., associated with one or more I/O devices), a set of circuits 850, and an interface 840 that connects the processor(s) 810, the memory 820, the I/O interface 830, and the set of circuits 850. I/O interface 830 can be configured to transfer data between memory 820, processor 810, circuits 850, and external devices, for example, medical imaging device(s) (e.g., CT, MRI, etc.), and/or one or more remote devices for receiving inputs and/or providing outputs to a clinician, patient, etc., such as optional personalized medicine device 860.

The processor(s) 810 and/or one or more circuits of the set of circuits 850 can perform one or more acts associated with a method or set of operations discussed herein, such as set of operations 100, 200, etc. In various embodiments, different acts (e.g., different operations of a set of operations) can be performed by the same or different processor(s) 810 and/or one or more circuits of the set of circuits 850.

Apparatus 800 can optionally further comprise personalized medicine device 860. Apparatus 800 can be configured to provide the predicted tumor mutational status and/or other data to personalized medicine device 860. Personalized medicine device 860 may be, for example, a computer assisted diagnosis (CADx) system or other type of personalized medicine device that can be used to facilitate monitoring and/or treatment of an associated medical condition. In some embodiments, processor(s) 810 and/or one or more circuits of the set of circuits 850 can be further configured to control personalized medicine device 860 to display the predicted mutational status for the tumor or other data on a computer monitor, a smartphone display, a tablet display, or other displays.

Examples herein can include subject matter such as an apparatus, a CT system, a MRI system, a personalized medicine system, a CADx system, a processor, a system, circuitry, a method, means for performing acts, steps, or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for predicting tumor mutational status, according to embodiments and examples described.

Example 1 is a non-transitory computer-readable medium storing computer-executable instructions that, when executed, cause a processor to perform operations, comprising: accessing a medical imaging scan of a tumor comprising a plurality of voxels; extracting one or more radiomic features from the plurality of voxels; generating a spatial feature descriptor indicating a first probability the tumor has a first mutation status and a second probability the tumor has a second mutation status, based on the medical imaging scan, a first population atlas associated with the first mutation status, and a second population atlas associated with the second mutation status; providing the one or more radiomic features and the spatial feature descriptor to a machine learning model; and receiving, via the machine learning model, a map indicating, for each voxel of the plurality of voxels, a first predicted probability of the first mutation status for that voxel and a second predicted probability of the second mutation status for that voxel, wherein the map is based at least on the one or more radiomic features and the spatial feature descriptor.

Example 2 comprises the subject matter of any variation of any of example(s) 1, wherein the operations further comprise employing one or more probabilistic pairwise Markov models (PPMMs) to improve the accuracy of the first predicted probability and the second predicted probability for each voxel of the plurality of voxels.

Example 3 comprises the subject matter of any variation of any of example(s) 1-2, wherein the machine learning model is one of, or an ensemble of two or more of, a Least Absolute Shrinkage and Selection Operator (LASSO) regression model, a naïve Bayes classifier, a support vector machine (SVM) with a linear kernel, a SVM with a radial basis function (RBF) kernel, a linear discriminant analysis (LDA) classifier, a quadratic discriminant analysis (QDA) classifier, a logistic regression classifier, a decision tree, a random forest, a diagonal LDA, a diagonal QDA, a neural network, an AdaBoost algorithm, an elastic net, a Gaussian process classification, or a nearest neighbors classification.

Example 4 comprises the subject matter of any variation of any of example(s) 1-3, wherein the one or more radiomic features comprise a first-order statistic of one or more of the following, extracted from the medical imaging scan or from the medical imaging scan after transformation with one of a filter or a wavelet decomposition: at least one Laws energy measure, at least one Gabor feature, at least one Haralick feature, at least one Laplace feature, at least one Co-occurrence of Local Anisotropic Gradient Orientations (CoLlAGe) feature, at least one Gray Level Size Zone Matrix, at least one Gray Level Run Length Matrix, at least one Neighboring Gray Tone Difference Matrix, at least one raw intensity value, at least one Gray Level Dependence Matrix, at least one shape feature, or at least one feature from at least one pre-trained Convolutional Neural Network (CNN).

Example 5 comprises the subject matter of any variation of any of example(s) 4, wherein the first-order statistic is one of a mean, a median, a standard deviation, a skewness, a kurtosis, a range, a minimum, a maximum, a percentile, or histogram frequencies.

Example 6 comprises the subject matter of any variation of any of example(s) 1-5, wherein the first mutation status is one of amplified or methylated, and the second mutation status is one of non-amplified or unmethylated.

Example 7 comprises the subject matter of any variation of any of example(s) 1-6, wherein the tumor is one of a glioblastoma, a colorectal cancer, or a breast cancer.

Example 8 comprises the subject matter of any variation of any of example(s) 1-7, wherein the operations further comprise identifying one or more potential biopsy locations based on the map.

Example 9 comprises the subject matter of any variation of any of example(s) 1-8, wherein the operations further comprise determining a mutation status for the tumor based on the map via one of a majority voting algorithm, a Bayesian consensus algorithm, or Dempster-Shafer's Theory of Evidence.

Example 10 comprises the subject matter of any variation of any of example(s) 1-9, wherein the operations further comprise providing one or more clinical features to the machine learning model, wherein the map is based at least in part on the one or more clinical features.

Example 11 is a non-transitory computer-readable medium storing computer-executable instructions that, when executed, cause a processor to perform operations, comprising: accessing a training set comprising a plurality of medical imaging scans, wherein each medical imaging scan of the training set comprises an associated tumor associated with a known mutation status for that medical imaging scan, wherein the known mutation status for that medical imaging scan is one of a first mutation status or a second mutation; constructing a first population atlas based on a first subset of the training set and a second population atlas based on a second subset of the training set, wherein the first mutation status is the known mutation status for each medical imaging scan of the first subset and the second mutation status is the known mutation status for each medical imaging scan of the second subset; for each medical imaging scan of the training set: extracting, for each radiomic feature of a set of radiomic features, an associated value for that radiomic feature from a region of interest of that medical imaging scan; selecting one or more best radiomic features from the set of radiomic features based on the extracted associated values and known mutation status for each medical imaging scan of the training set; and constructing a machine learning model configured to generate a map indicating, for each voxel of a plurality of voxels of an additional medical imaging scan, a first predicted probability of the first mutation status for that voxel and a second predicted probability of the second mutation status for that voxel, wherein the map is based at least on the one or more best radiomic features, the first population atlas, and the second population atlas.

Example 12 comprises the subject matter of any variation of any of example(s) 11, wherein selecting the one or more best features is based on Spearman's correlation metric.

Example 13 comprises the subject matter of any variation of any of example(s) 11-12, wherein the machine learning model is one of, or an ensemble of two or more of, a Least Absolute Shrinkage and Selection Operator (LASSO) regression model, a naïve Bayes classifier, a support vector machine (SVM) with a linear kernel, a SVM with a radial basis function (RBF) kernel, a linear discriminant analysis (LDA) classifier, a quadratic discriminant analysis (QDA) classifier, a logistic regression classifier, a decision tree, a random forest, a diagonal LDA, a diagonal QDA, a neural network, an AdaBoost algorithm, an elastic net, a Gaussian process classification, or a nearest neighbors classification.

Example 14 comprises the subject matter of any variation of any of example(s) 11-13, wherein the set of radiomic features comprise a first-order statistic of one or more of the following, extracted from each medical imaging scan or from each medical imaging scan after transformation with one of a filter or a wavelet decomposition: at least one Laws energy measure, at least one Gabor feature, at least one Haralick feature, at least one Laplace feature, at least one Co-occurrence of Local Anisotropic Gradient Orientations (CoLlAGe) feature, at least one Gray Level Size Zone Matrix, at least one Gray Level Run Length Matrix, at least one Neighboring Gray Tone Difference Matrix, at least one raw intensity value, at least one Gray Level Dependence Matrix, at least one shape feature, or at least one feature from at least one pre-trained Convolutional Neural Network (CNN).

Example 15 comprises the subject matter of any variation of any of example(s) 14, wherein the first-order statistic is one of a mean, a median, a standard deviation, a skewness, a kurtosis, a range, a minimum, a maximum, a percentile, or histogram frequencies.

Example 16 comprises the subject matter of any variation of any of example(s) 11-15, wherein the first mutation status is one of amplified or methylated, and the second mutation status is one of non-amplified or unmethylated.

Example 17 comprises the subject matter of any variation of any of example(s) 11-16, wherein, for each medical imaging scan of the training set, the associated tumor is one of a glioblastoma, a colorectal cancer, or a breast cancer.

Example 18 is an apparatus, comprising: memory configured to store a medical imaging scan of a tumor comprising a plurality of voxels; one or more processors configured to: extract one or more radiomic features from the plurality of voxels; generate a spatial feature descriptor indicating a first probability the tumor has a first mutation status and a second probability the tumor has a second mutation status, based on the medical imaging scan, a first population atlas associated with the first mutation status, and a second population atlas associated with the second mutation status; provide the one or more radiomic features and the spatial feature descriptor to a machine learning model; and receive, via the machine learning model, a map indicating, for each voxel of the plurality of voxels, a first predicted probability of the first mutation status for that voxel and a second predicted probability of the second mutation status for that voxel, wherein the map is based at least on the one or more radiomic features and the spatial feature descriptor.

Example 19 comprises the subject matter of any variation of any of example(s) 18, wherein the one or more processors are further configured to employ one or more probabilistic pairwise Markov models (PPMMs) to improve the accuracy of the first predicted probability and the second predicted probability for each voxel of the plurality of voxels.

Example 20 comprises the subject matter of any variation of any of example(s) 18-19, wherein the machine learning model is one of, or an ensemble of two or more of, a Least Absolute Shrinkage and Selection Operator (LASSO) regression model, a naïve Bayes classifier, a support vector machine (SVM) with a linear kernel, a SVM with a radial basis function (RBF) kernel, a linear discriminant analysis (LDA) classifier, a quadratic discriminant analysis (QDA) classifier, a logistic regression classifier, a decision tree, a random forest, a diagonal LDA, a diagonal QDA, a neural network, an AdaBoost algorithm, an elastic net, a Gaussian process classification, or a nearest neighbors classification.

Example 21 comprises the subject matter of any variation of any of example(s) 18-20, wherein the one or more radiomic features comprise a first-order statistic of one or more of the following, extracted from the medical imaging scan or from the medical imaging scan after transformation with one of a filter or a wavelet decomposition: at least one Laws energy measure, at least one Gabor feature, at least one Haralick feature, at least one Laplace feature, at least one Co-occurrence of Local Anisotropic Gradient Orientations (CoLlAGe) feature, at least one Gray Level Size Zone Matrix, at least one Gray Level Run Length Matrix, at least one Neighboring Gray Tone Difference Matrix, at least one raw intensity value, at least one Gray Level Dependence Matrix, at least one shape feature, or at least one feature from at least one pre-trained Convolutional Neural Network (CNN).

Example 22 comprises the subject matter of any variation of any of example(s) 21, wherein the first-order statistic is one of a mean, a median, a standard deviation, a skewness, a kurtosis, a range, a minimum, a maximum, a percentile, or histogram frequencies.

Example 23 comprises the subject matter of any variation of any of example(s) 18-22, wherein the first mutation status is one of amplified or methylated, and the second mutation status is one of non-amplified or unmethylated.

Example 24 comprises the subject matter of any variation of any of example(s) 18-23, wherein the tumor is one of a glioblastoma, a colorectal cancer, or a breast cancer.

Example 25 comprises the subject matter of any variation of any of example(s) 18-24, wherein the one or more processors are further configured to identify one or more potential biopsy locations based on the map.

Example 26 comprises the subject matter of any variation of any of example(s) 18-25, wherein the one or more processors are further configured to determine a mutation status for the tumor based on the map via one of a majority voting algorithm, a Bayesian consensus algorithm, or Dempster-Shafer's Theory of Evidence.

Example 27 comprises the subject matter of any variation of any of example(s) 18-26, wherein the one or more processors are further configured to provide one or more clinical features to the machine learning model, wherein the map is based at least in part on the one or more clinical features.

Example 28 comprises an apparatus comprising means for executing any of the described operations of examples 1-27.

Example 29 comprises a machine readable medium that stores instructions for execution by a processor to perform any of the described operations of examples 1-27.

Example 30 comprises an apparatus comprising: a memory; and one or more processors configured to: perform any of the described operations of examples 1-27.

References to "one embodiment", "an embodiment", "one example", and "an example" indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage device", as used herein, refers to a device that stores instructions or data. "Computer-readable storage device" does not refer to propagated signals. A computer-readable storage device may take forms, including, but not limited to, non-volatile media, and volatile media. Non-volatile media may include, for example, optical disks, magnetic disks, tapes, and other media. Volatile media may include, for example, semiconductor memories, dynamic memory, and other media. Common forms of a computer-readable storage device may include, but are not limited to, a floppy disk, a flexible disk, a hard disk, a magnetic tape, other magnetic medium, an application specific integrated circuit (ASIC), a compact disk (CD), other optical medium, a random access memory (RAM), a read only memory (ROM), a memory chip or card, a memory stick, and other media from which a computer, a processor or other electronic device can read.

"Circuit", as used herein, includes but is not limited to hardware, firmware, software in execution on a machine, or combinations of each to perform a function(s) or an action(s), or to cause a function or action from another logic, method, or system. A circuit may include a software controlled microprocessor, a discrete logic (e.g., ASIC), an analog circuit, a digital circuit, a programmed logic device, a memory device containing instructions, and other physical devices. A circuit may include one or more gates, combinations of gates, or other circuit components. Where multiple logical circuits are described, it may be possible to incorporate the multiple logical circuits into one physical circuit. Similarly, where a single logical circuit is described, it may be possible to distribute that single logical circuit between multiple physical circuits.

To the extent that the term "includes" or "including" is employed in the detailed description or the claims, it is intended to be inclusive in a manner similar to the term "comprising" as that term is interpreted when employed as a transitional word in a claim.

Throughout this specification and the claims that follow, unless the context requires otherwise, the words 'comprise' and 'include' and variations such as 'comprising' and 'including' will be understood to be terms of inclusion and not exclusion. For example, when such terms are used to refer to a stated integer or group of integers, such terms do not imply the exclusion of any other integer or group of integers.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

What is claimed is:

1. A non-transitory computer-readable medium storing computer-executable instructions that, when executed, cause a processor to perform operations, comprising:

accessing a medical imaging scan of a tumor comprising a plurality of voxels;

extracting one or more radiomic features from the plurality of voxels;

generating a spatial feature descriptor indicating a first probability the tumor has a first mutation status and a second probability the tumor has a second mutation status, based on the medical imaging scan, a first population atlas associated with the first mutation status, and a second population atlas associated with the second mutation status;

providing the one or more radiomic features and the spatial feature descriptor to a machine learning model; and receiving, via the machine learning model, a map indicating, for each voxel of the plurality of voxels, a first predicted probability of the first mutation status for that voxel and a second predicted probability of the second mutation status for that voxel, wherein the map is based at least on the one or more radiomic features and the spatial feature descriptor.

2. The non-transitory computer-readable medium of claim 1, wherein the operations further comprise employing one or more probabilistic pairwise Markov models (PPMMs) to improve an accuracy of the first predicted probability and the second predicted probability for each voxel of the plurality of voxels.

3. The non-transitory computer-readable medium of claim 1, wherein the machine learning model is one of, or an ensemble of two or more of, a Least Absolute Shrinkage and Selection Operator (LASSO) regression model, a naïve Bayes classifier, a support vector machine (SVM) with a linear kernel, a SVM with a radial basis function (RBF) kernel, a linear discriminant analysis (LDA) classifier, a quadratic discriminant analysis (QDA) classifier, a logistic regression classifier, a decision tree, a random forest, a diagonal LDA, a diagonal QDA, a neural network, an AdaBoost algorithm, an elastic net, a Gaussian process classification, or a nearest neighbors classification.

4. The non-transitory computer-readable medium of claim 1, wherein the one or more radiomic features comprise a first-order statistic of one or more of the following, extracted from the medical imaging scan or from the medical imaging scan after transformation with one of a filter or a wavelet decomposition: at least one Laws energy measure, at least one Gabor feature, at least one Haralick feature, at least one Laplace feature, at least one Co-occurrence of Local Anisotropic Gradient Orientations (CoLlAGe) feature, at least one Gray Level Size Zone Matrix, at least one Gray Level Run Length Matrix, at least one Neighboring Gray Tone Difference Matrix, at least one raw intensity value, at least one Gray Level Dependence Matrix, at least one shape feature, or at least one feature from at least one pre-trained Convolutional Neural Network (CNN).

5. The non-transitory computer-readable medium of claim 4, wherein the first-order statistic is one of a mean, a median, a standard deviation, a skewness, a kurtosis, a range, a minimum, a maximum, a percentile, or histogram frequencies.

6. The non-transitory computer-readable medium of claim 1, wherein the first mutation status is one of amplified or methylated, and the second mutation status is one of non-amplified or unmethylated.

7. The non-transitory computer-readable medium of claim 1, wherein the tumor is one of a glioblastoma, a colorectal cancer, or a breast cancer.

8. The non-transitory computer-readable medium of claim 1, wherein the operations further comprise identifying one or more potential biopsy locations based on the map.

9. The non-transitory computer-readable medium of claim 1, wherein the operations further comprise determining a mutation status for the tumor based on the map via one of a majority voting algorithm, a Bayesian consensus algorithm, or Dempster-Shafer's Theory of Evidence.

10. The non-transitory computer-readable medium of claim 1, wherein the operations further comprise providing one or more clinical features to the machine learning model, wherein the map is based at least in part on the one or more clinical features.

11. A non-transitory computer-readable medium storing computer-executable instructions that, when executed, cause a processor to perform operations, comprising:

accessing a training set comprising a plurality of medical imaging scans, wherein each medical imaging scan of the training set comprises an associated tumor associated with a known mutation status for that medical imaging scan, wherein the known mutation status for that medical imaging scan is one of a first mutation status or a second mutation status;

constructing a first population atlas based on a first subset of the training set and a second population atlas based on a second subset of the training set, wherein the first mutation status is the known mutation status for each medical imaging scan of the first subset and the second mutation status is the known mutation status for each medical imaging scan of the second subset;

for each medical imaging scan of the training set, extracting, for each radiomic feature of a set of radiomic features, an associated value for that radiomic feature from a region of interest of that medical imaging scan;

selecting one or more best radiomic features from the set of radiomic features based on the extracted associated values and known mutation status for each medical imaging scan of the training set; and constructing a machine learning model configured to generate a map indicating, for each voxel of a plurality of voxels of an additional medical imaging scan, a first predicted probability of the first mutation status for that voxel and a second predicted probability of the second mutation status for that voxel, wherein the map is based at least on the one or more best radiomic features, the first population atlas, and the second population atlas.

12. The non-transitory computer-readable medium of claim 11, wherein selecting the one or more best radiomic features is based on Spearman's correlation metric.

13. The non-transitory computer-readable medium of claim 11, wherein the machine learning model is one of, or an ensemble of two or more of, a Least Absolute Shrinkage and Selection Operator (LASSO) regression model, a naïve Bayes classifier, a support vector machine (SVM) with a linear kernel, a SVM with a radial basis function (RBF) kernel, a linear discriminant analysis (LDA) classifier, a quadratic discriminant analysis (QDA) classifier, a logistic regression classifier, a decision tree, a random forest, a diagonal LDA, a diagonal QDA, a neural network, an AdaBoost algorithm, an elastic net, a Gaussian process classification, or a nearest neighbors classification.

14. The non-transitory computer-readable medium of claim 11, wherein the set of radiomic features comprise a first-order statistic of one or more of the following, extracted from each medical imaging scan or from each medical imaging scan after transformation with one of a filter or a wavelet decomposition: at least one Laws energy measure, at least one Gabor feature, at least one Haralick feature, at least one Laplace feature, at least one Co-occurrence of Local Anisotropic Gradient Orientations (CoLlAGe) feature, at least one Gray Level Size Zone Matrix, at least one Gray Level Run Length Matrix, at least one Neighboring Gray Tone Difference Matrix, at least one raw intensity value, at least one Gray Level Dependence Matrix, at least one shape feature, or at least one feature from at least one pre-trained Convolutional Neural Network (CNN).

15. The non-transitory computer-readable medium of claim 14, wherein the first-order statistic is one of a mean, a median, a standard deviation, a skewness, a kurtosis, a range, a minimum, a maximum, a percentile, or histogram frequencies.

16. The non-transitory computer-readable medium of claim 11, wherein the first mutation status is one of amplified or methylated, and the second mutation status is one of non-amplified or unmethylated.

17. The non-transitory computer-readable medium of claim 11, wherein, for each medical imaging scan of the training set, the associated tumor is one of a glioblastoma, a colorectal cancer, or a breast cancer.

18. An apparatus, comprising:
memory configured to store a medical imaging scan of a tumor comprising a plurality of voxels;
one or more processors configured to:
extract one or more radiomic features from the plurality of voxels;
generate a spatial feature descriptor indicating a first probability the tumor has a first mutation status and a second probability the tumor has a second mutation status, based on the medical imaging scan, a first population atlas associated with the first mutation status, and a second population atlas associated with the second mutation status;
provide the one or more radiomic features and the spatial feature descriptor to a machine learning model; and
receive, via the machine learning model, a map indicating, for each voxel of the plurality of voxels, a first predicted probability of the first mutation status for that voxel and a second predicted probability of the second mutation status for that voxel, wherein the map is based at least on the one or more radiomic features and the spatial feature descriptor.

19. The apparatus of claim 18, wherein the one or more processors are further configured to employ one or more probabilistic pairwise Markov models (PPMMs) to improve an accuracy of the first predicted probability and the second predicted probability for each voxel of the plurality of voxels.

20. The apparatus of claim 18, wherein the machine learning model is one of, or an ensemble of two or more of, a Least Absolute Shrinkage and Selection Operator (LASSO) regression model, a naïve Bayes classifier, a support vector machine (SVM) with a linear kernel, a SVM with a radial basis function (RBF) kernel, a linear discriminant analysis (LDA) classifier, a quadratic discriminant analysis (QDA) classifier, a logistic regression classifier, a decision tree, a random forest, a diagonal LDA, a diagonal QDA, a neural network, an AdaBoost algorithm, an elastic net, a Gaussian process classification, or a nearest neighbors classification.

21. The apparatus of claim 18, wherein the one or more radiomic features comprise a first-order statistic of one or more of the following, extracted from the medical imaging scan or from the medical imaging scan after transformation with one of a filter or a wavelet decomposition: at least one Laws energy measure, at least one Gabor feature, at least one Haralick feature, at least one Laplace feature, at least one Co-occurrence of Local Anisotropic Gradient Orientations (CoLlAGe) feature, at least one Gray Level Size Zone Matrix, at least one Gray Level Run Length Matrix, at least one Neighboring Gray Tone Difference Matrix, at least one raw intensity value, at least one Gray Level Dependence Matrix, at least one shape feature, or at least one feature from at least one pre-trained Convolutional Neural Network (CNN).

22. The apparatus of claim 21, wherein the first-order statistic is one of a mean, a median, a standard deviation, a skewness, a kurtosis, a range, a minimum, a maximum, a percentile, or histogram frequencies.

23. The apparatus of claim 18, wherein the first mutation status is one of amplified or methylated, and the second mutation status is one of non-amplified or unmethylated.

24. The apparatus of claim 18, wherein the tumor is one of a glioblastoma, a colorectal cancer, or a breast cancer.

25. The apparatus of claim 18, wherein the one or more processors are further configured to identify one or more potential biopsy locations based on the map.

26. The apparatus of claim 18, wherein the one or more processors are further configured to determine a mutation status for the tumor based on the map via one of a majority voting algorithm, a Bayesian consensus algorithm, or Dempster-Shafer's Theory of Evidence.

27. The apparatus of claim 18, wherein the one or more processors are further configured to provide one or more clinical features to the machine learning model, wherein the map is based at least in part on the one or more clinical features.

\* \* \* \* \*